US010356772B2

(12) United States Patent
Zhu et al.

(10) Patent No.: US 10,356,772 B2
(45) Date of Patent: Jul. 16, 2019

(54) BEARER MOBILITY AND SPLITTING IN A RADIO ACCESS NETWORK-BASED, 3RD GENERATION PARTNERSHIP PROJECT NETWORK HAVING AN INTEGRATED WIRELESS LOCAL AREA NETWORK

(71) Applicant: INTEL CORPORATION, Santa Clara, CA (US)

(72) Inventors: Jing Zhu, Portland, OR (US); Nageen Himayat, Fremont, CA (US); Alexander Sirotkin, Petach Tikva (IL); Alexandre S. Stojanovski, Paris (FR)

(73) Assignee: INTEL CORPORATION, Santa Clara, CA (US)

( * ) Notice: Subject to any disclaimer, the term of this patent is extended or adjusted under 35 U.S.C. 154(b) by 233 days.

(21) Appl. No.: 15/394,954

(22) Filed: Dec. 30, 2016

(65) Prior Publication Data
US 2017/0215173 A1 Jul. 27, 2017

Related U.S. Application Data

(63) Continuation of application No. 14/583,172, filed on Dec. 25, 2014, now Pat. No. 9,596,707.
(Continued)

(51) Int. Cl.
H04W 28/06 (2009.01)
H04W 72/04 (2009.01)
(Continued)

(52) U.S. Cl.
CPC ....... H04W 72/042 (2013.01); H04W 28/065 (2013.01); H04W 28/08 (2013.01);
(Continued)

(58) Field of Classification Search
CPC ... H04W 72/042; H04W 76/11; H04W 76/16; H04W 28/08; H04W 28/065; H04W 88/06; H04W 92/10; H04W 88/10; H04W 84/12
See application file for complete search history.

(56) References Cited

U.S. PATENT DOCUMENTS 9,055,504 B1 6/2015 Singh et al.
2004/0001468 A1 1/2004 Bichot et al.
(Continued)

FOREIGN PATENT DOCUMENTS

EP 2493239 A1 * 8/2012 ............ H04W 80/02
EP 2688363 A2 1/2014
(Continued)

OTHER PUBLICATIONS

U.S. Appl. No. 14/583,172, Final Office Action, dated Jul. 19, 2016, 24 pages.
(Continued)

Primary Examiner — Curtis A Alia
(74) Attorney, Agent, or Firm — Stoel Rives LLP

(57) ABSTRACT

A wireless local area network (WLAN) point-to-point communications link between an evolved universal terrestrial radio access network node B (eNB) and a user equipment device (or simply UE) is identified by UE/eNB media access control (MAC) identifiers on a per UE or per data radio bearer (DRB) basis for offloading cellular data from a long term evolution (LTE) link to the WLAN point-to-point communications link. A wireless local area network tunneling protocol (WLTP) includes packet formats and network protocol stack arrangements to support functions facilitated by the WLAN point-to-point communications link, such as, for example, identification of control and data traffic messages, DRB identification for WLTP packets, quality of service (QoS) delay and packet loss measurement, support
(Continued)

Enhanced IP-based U-Plane Tunneling Protocol Stack of bearer splitting, and support of a general framework for offloading cellular traffic at different depths of the 3rd Generation Partnership Project (3GPP) network protocol stack.

20 Claims, 7 Drawing Sheets

Related U.S. Application Data

(60) Provisional application No. 61/952,777, filed on Mar. 13, 2014.

(51) Int. Cl.

| | | |
|---|---|---|
| *H04W 28/08* | (2009.01) | |
| *H04W 88/06* | (2009.01) | |
| *H04W 76/16* | (2018.01) | |
| *H04W 76/22* | (2018.01) | |
| *H04W 84/12* | (2009.01) | |
| *H04W 88/10* | (2009.01) | |
| *H04W 92/10* | (2009.01) | |

(52) U.S. Cl.
CPC .......... *H04W 76/16* (2018.02); *H04W 76/22* (2018.02); *H04W 88/06* (2013.01); *H04W 84/12* (2013.01); *H04W 88/10* (2013.01); *H04W 92/10* (2013.01)

(56) References Cited

U.S. PATENT DOCUMENTS

| | | | |
|---|---|---|---|
| 2005/0157673 A1 | 7/2005 | Verma et al. | |
| 2005/0210154 A1 | 9/2005 | Verma et al. | |
| 2011/0205986 A1 | 8/2011 | Medapalli | |
| 2011/0222523 A1* | 9/2011 | Fu | H04W 36/22 370/338 |
| 2013/0083783 A1 | 4/2013 | Gupta et al. | |
| 2013/0121322 A1 | 5/2013 | Salkintzis | |
| 2013/0155918 A1* | 6/2013 | Singh | H04W 28/06 370/310 |
| 2013/0203459 A1 | 8/2013 | Lee et al. | |
| 2013/0329694 A1* | 12/2013 | Vrzic | H04W 36/165 370/331 |
| 2014/0010207 A1 | 1/2014 | Horn et al. | |
| 2014/0050086 A1 | 2/2014 | Himayat et al. | |
| 2014/0071925 A1 | 3/2014 | Liu | |
| 2014/0119353 A1 | 5/2014 | McCann et al. | |
| 2014/0219100 A1 | 8/2014 | Pandey et al. | |
| 2015/0092688 A1 | 4/2015 | Jeong et al. | |

FOREIGN PATENT DOCUMENTS

| | | |
|---|---|---|
| KR | 1020130106326 A | 9/2013 |
| WO | 2012119119 A1 | 9/2012 |
| WO | 2013100629 A1 | 7/2013 |
| WO | 2013144714 A2 | 10/2013 |
| WO | 2014008380 A1 | 1/2014 |
| WO | 2014107358 A1 | 7/2014 |

OTHER PUBLICATIONS

U.S. Appl. No. 14/583,172, Notice of Allowance, dated Oct. 13, 2016, 8 pages.
3GPP TR 23.852, "Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12)", V12.0.0, Sep. 2013, 157 pages.
PCT/US2015/015403, International Search Report and Written Opinion, dated May 22, 2015, 11 pages.
PCT/US2015/015403, International Preliminary Report on Patentability, dated Sep. 22, 2016, 8 pages.
Intel Corporation, "Discussions on Carrier Aggregation across LTE and WIFI", RP-111094, 3GPP TSG-RAN meeting #53, Fukuoka, Japan, Agenda Item 13.2.1, Sep. 13-16, 2011, 4 pages.
Qualcomm Incorporated, Ericsson,, "Text proposal on WLAN/3GPP radio Interworking solution 3", R2-132194, 3GPP TSG-RAN2#82, Fukuoka, Japan, Agenda Item 5.1.1, May 20-24, 2013, 5 pages.

* cited by examiner

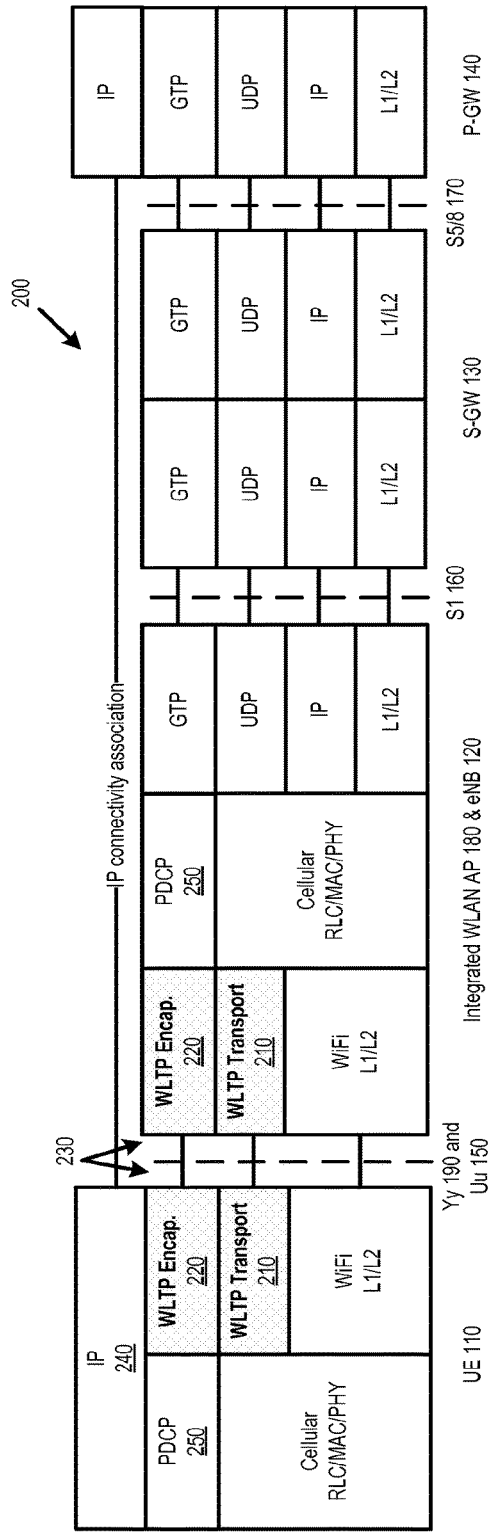
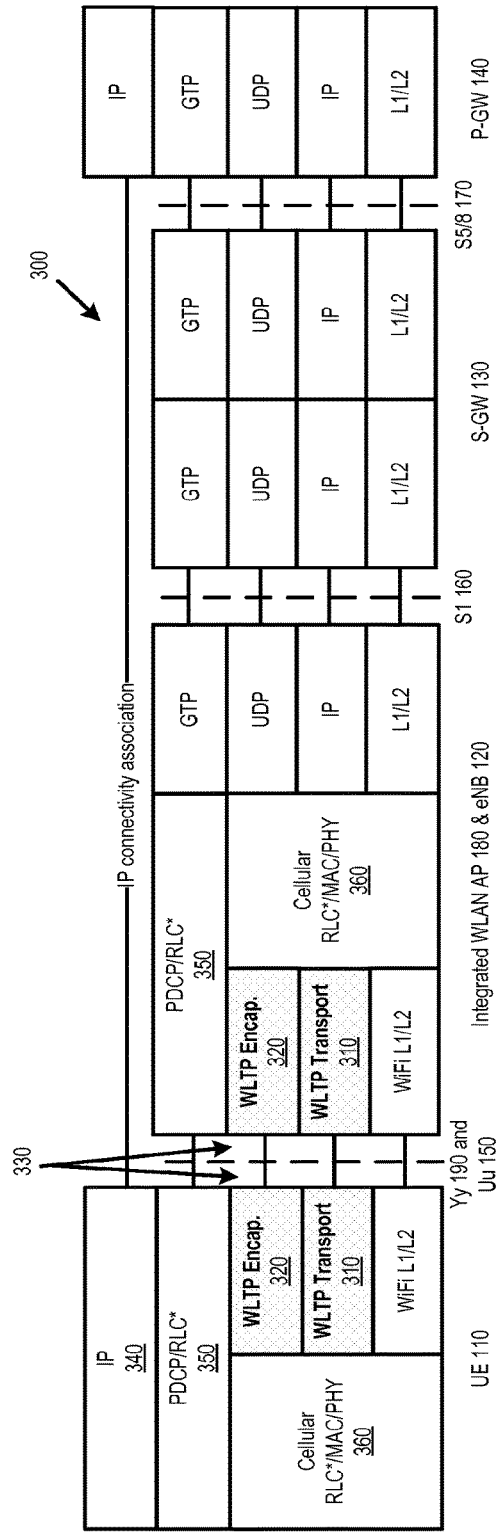
FIG. 2
FIG. 3

Enhanced IP-based U-Plane Tunneling Protocol Stack

ABSTRACT

BEARER MOBILITY AND SPLITTING IN A RADIO ACCESS NETWORK-BASED, 3RD GENERATION PARTNERSHIP PROJECT NETWORK HAVING AN INTEGRATED WIRELESS LOCAL AREA NETWORK

RELATED APPLICATION

The present application is a continuation of U.S. patent application Ser. No. 14/583,172 filed Dec. 25, 2014, which claims benefit of U.S. Provisional Patent Application No. 61/952,777, filed Mar. 13, 2014, both of which are incorporated herein by reference in their entirety.

TECHNICAL FIELD

Implementations of the claimed invention generally may relate to the field of wireless communications.

BACKGROUND INFORMATION

A wireless local area network (WLAN) is a wireless computer network that includes a WLAN access point (AP) linking two or more devices using a wireless distribution method, often spread-spectrum or orthogonal frequency-division multiplexing (OFDM) radio, within a relatively small area such as a home, school, computer laboratory, or office building. This wireless distribution method provides users the ability to move around within a local coverage area while maintaining network connectivity, and thereby facilitates a connection to the wider Internet. Most modern WLANs are based on the standards of the Institute of Electrical and Electronics Engineers (IEEE) 802.11, marketed under the Wi-Fi trademark.

The 3rd Generation Partnership Project (3GPP) Technical Report (TR) No. 23.852 (version 12.0.0) describes aspects of identifying a point-to-point (pt-to-pt) communication link via a WLAN. The pt-to-pt communication link described in TR 23.852, however, is between a user equipment device (or simply UE) and a trusted WLAN Access Gateway (TWAG).

BRIEF DESCRIPTION OF THE DRAWINGS

FIG. 2 is a block diagram of an internet protocol (IP)-based user-plane tunneling protocol stack, according to a first embodiment including a WLAN tunneling protocol (WLTP).

FIG. 3 is a block diagram of a packet data convergence protocol (PDCP)-based, or a radio link control (RLC)-based, user-plane tunneling protocol stack, according to a second embodiment including the WLTP.

DETAILED DESCRIPTION OF EMBODIMENTS

Figure 1:
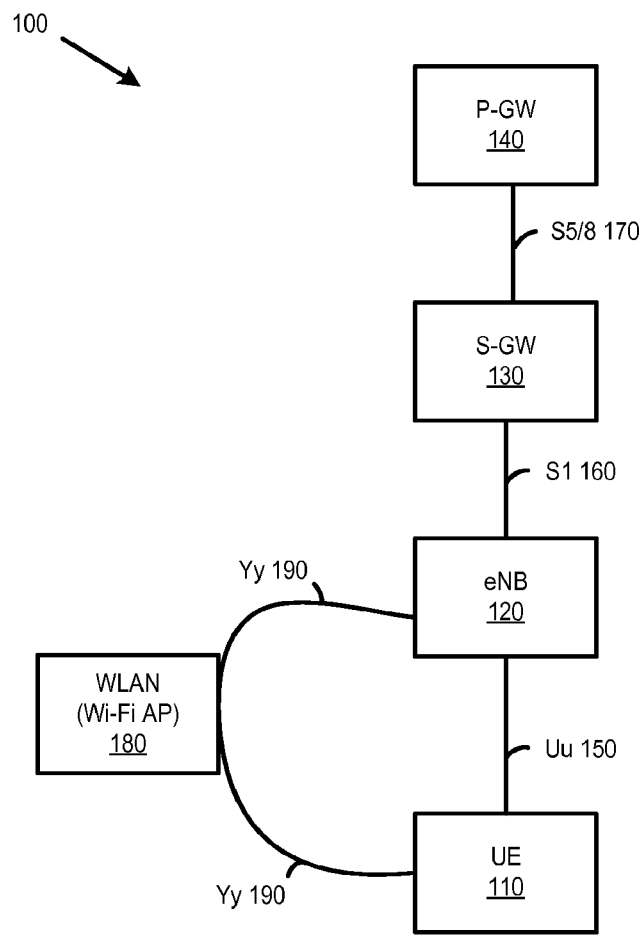
FIG. 1 is a block diagram of a radio access network (RAN)-based integrated WLAN and 3GPP network architecture.

This disclosure describes features of a WLAN pt-to-pt communication link between a UE, as a first point, and an evolved universal terrestrial radio access network node B (also known as evolved node B, abbreviated as eNodeB or eNB), as a second point, for routing cellular traffic via a WLAN and thereby establishing a 3GPP RAN anchored WLAN. In other words, this disclosure describes techniques for deploying WLAN technology as another potential air interface for a UE to use during transmissions of cellular data conveyed either over WLAN or long term evolution (LTE) wireless pt-to-pt communication links between an eNB and a UE.

An example deployment model for the aforementioned pt-to-pt communication links includes an eNB having at least one WLAN AP within the larger cellular coverage cell of the eNB. In such a configuration, a WLAN AP is networked with the eNB using conventional wired or wireless connections, or as an integral component of the eNB system, and the UE is wirelessly connected (according to conventional WLAN networking standards) to the WLAN AP through a WLAN communication link so as to establish a WLAN pt-to-pt communication link between the eNB and the UE. Assuming that the WLAN pt-to-pt communication link is established according to the techniques described in subsequent paragraphs of this disclosure, the deployment model includes a small WLAN cell employing the WLAN spectrum that is different from that of the eNB. The small WLAN cell provides supplemental bandwidth that effectively increases the total bandwidth available to the UE.

The following description is organized according to four subsections, summarized as follows.

A first subsection provides an overview of an end-to-end cellular network embodiment that includes a WLAN pt-to-pt communication link between a UE (also called a client) and an eNB (also referred to as a base station).

A second subsection describes in further detail techniques for identifying the WLAN pt-to-pt communication link, which may comprise either a single link identified by the UE's media access control (MAC) address or other unique identifier, or several links with each link corresponding to a data radio bearer (DRB) of the UE. In the 3GPP terminology, a bearer represents a class of traffic having a set of network parameters that establish a specific standard treatment for the traffic. And DRBs carry user plane traffic (i.e., user data) on an air interface. Accordingly, the second subsection sets forth embodiments including per UE and per DRB WLAN pt-to-pt communication links identified by, e.g., UE and eNB MAC addresses or identifiers.

A third subsection describes tunneling layers and formats used by UE and eNB communication circuitry to send and receive cellular traffic over a WLAN so as to bypass an LTE link and thereby offload the cellular traffic at different depths of the 3GPP protocol stack. In other words, the third subsection concerns how the UE and the eNB format data packets and convey them using, for example, a WLTP having a packet header after a data link layer (layer 2, IEEE 802.11 frame) to identify various types of payloads and support the following functions over the WLAN pt-to-pt communication link: identifying whether a packet is for a control message or a data message; if it is a data message, then identifying which DRB the packet belongs to; supporting measurements such as quality of service (QoS) delay or packet loss measurement; and bearer splitting between WLAN and LTE.

A fourth subsection describes an example of a UE and provides other example embodiments.

Additional aspects and advantages will be apparent from the following detailed description of embodiments, which proceeds with reference to the accompanying drawings. The same reference numbers may be used in different drawings to identify the same or similar elements. In the following description, for purposes of explanation and not limitation, specific details are set forth, such as particular structures, architectures, interfaces, techniques, etc., in order to provide a thorough understanding of the various aspects of the claimed invention. However, it will be apparent to skilled persons having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail. Also, as an aside, skilled persons will recognize that the use of the "I" is for purpose of conciseness. For example, the phrase "A/B" means (A), (B), or (A and B), which is synonymous with the phrase "A and/or B". And the phrase "at least one of A, B, and C" means (A), (B), (C), (A and B), (A and C), (B and C), or (A, B, and C).

Network Overview

FIG. 1 illustrates a network architecture 100 likely to be standardized by the 3GPP RAN working group in the forthcoming 13th release of the 3GPP standardization for LTE wireless networks. The network architecture 100 shows an end-to-end network for cellular communications, including a UE 110, an eNB 120, and the following two gateway entities of an evolved packet core (EPC): a serving gateway (S-GW) 130 and a packet data network (PDN) gateway (PDN GW, or P-GW) 140. Skilled persons will recognize that an EPC typically includes other network entities and interfaces that, for conciseness, are not shown in FIG. 1.

Figure 9:
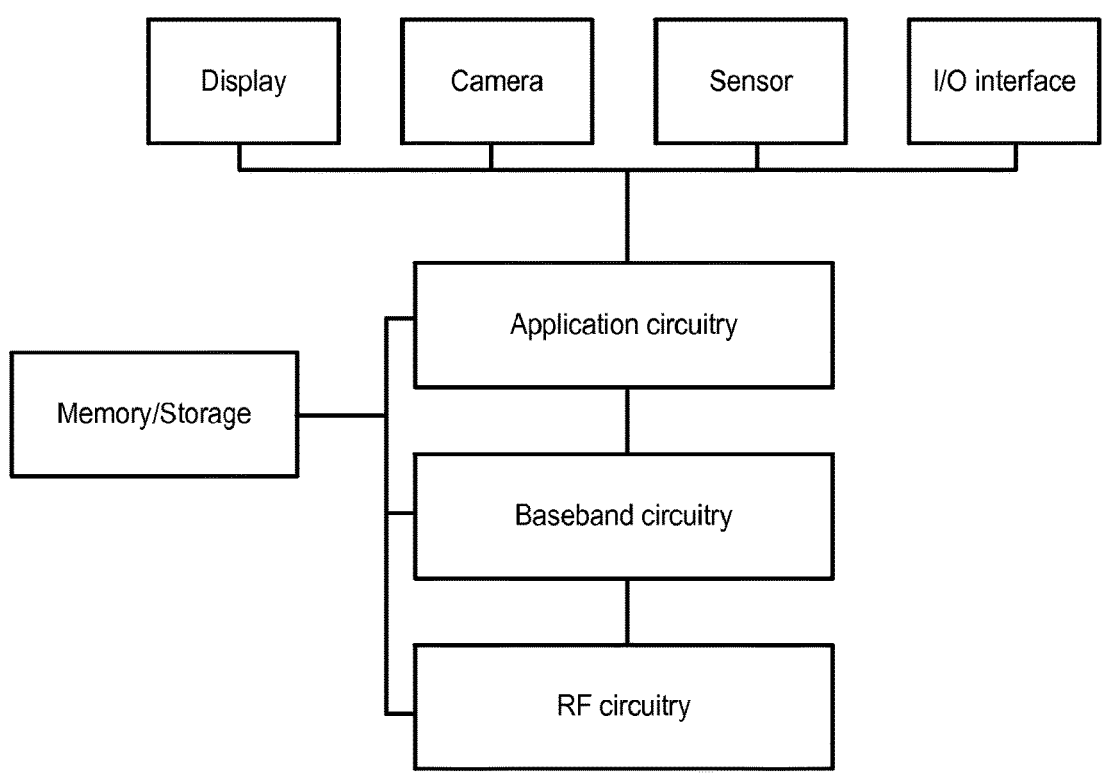
FIG. 9 is a block diagram of a UE.

The UE 110, an example of which is described in further detail in subsequent paragraphs with reference to FIG. 9, communicates with the eNB 120 through an air interface Uu 150 (also referred to as a cellular link), which may comprise a wireless radio communication channel defined in 3GPP standards for long term evolution (LTE) wireless networks.

The S-GW 130, in communication with the eNB 120 through an S1 interface 160, provides a point of interconnect between the wireless radio side and the EPC side of the network architecture 100. The S-GW 130 is the anchor point for the intra-LTE mobility, i.e., in case of a handover between eNBs and between LTE and other 3GPP accesses. The S-GW 130 is logically connected to the other gateway, the P-GW 140, through an S5/8 interface 170. 3GPP standards specify separately the S-GW 130 and the P-GW 140, but in practice, these gateways may be combined as a common network component provided by a network equipment vendor.

The P-GW 140 provides a point of interconnect between the EPC and an external internet protocol (IP) network (not shown). An external IP network is also called a PDN. The P-GW 140 routes IP packets to and from PDNs.

In addition to the aforementioned end-to-end cellular network components, FIG. 1 also shows that the UE 110 communicates with the eNB 120 through a WLAN 180 via a Yy interface 190. The Yy interface 190 represents the operative network connection and protocols between the UE 110 and its associated cellular base station, the eNB 120. In other words, the Yy interface 190 is a logical interface that may be realized by a WLAN pt-to-pt communication link between the UE 110 and the eNB 120 for routing the UE 110's cellular traffic via the WLAN 180. For this reason, the terms "Yy interface" and "WLAN pt-to-pt communication link" are for the most part used interchangeably.

Identification of the WLAN Pt-to-Pt Communication Link

Initially, the UE 110 and the eNB 120 perform signaling to exchange parameters for identifying the WLAN pt-to-pt communication link 190. For example, the eNB (base station) 120 will send a message—a control message, control signal, radio resource control (RRC) message, or other type of message—to the UE 110 to request an identifier for the link 190. This subsection describes two approaches for identifying WLAN pt-to-pt communication links.

A first approach entails identifying a link on a per UE basis. In other words, each UE may accommodate one WLAN pt-to-pt communication link between itself and the eNB for communicating traffic therebetween. Applying this approach to the architecture 100, the WLAN pt-to-pt communication link 190 is defined by the combination of the unique MAC address that is used for the UE 110 and the MAC address that is used for the eNB 120. This approach relies on the fact that each UE has a unique MAC address, so the UE 110 can be identified by its unique MAC address. And the unique MAC address, in combination with the eNB 120's v-MAC identifier (MAC address), may therefore be used to identify the WLAN pt-to-pt communication link 190 on a per UE basis. According to the first, per UE approach, the traffic offloaded to the WLAN 180 is delivered in one WLAN pt-to-pt communication link, and one v-MAC identifier (MAC address) is used for the eNB 120.

A second approach entails identifying a link on a per DRB basis, in which case a UE may accommodate multiple links based on the number of DRBs it employs. For example, if the UE 110 has two DRBs, then it also may have two WLAN pt-to-pt communication links 190 with the eNB 120. The 3GPP standards currently specify a maximum number of eight DRBs for a UE, in which case the UE 110 could accommodate a maximum of eight WLAN pt-to-pt communication links 190. But in this second approach, a single MAC address of the eNB 120 cannot readily identify all eight links. Thus, according to the second embodiment, the depiction of the WLAN pt-to-pt communication link 190 in FIG. 1 actually represents multiple links established per DRB by using different v-MAC identifiers to distinguish each connection. In the second, per DRB link approach, a UE has its traffic from its different DRBs delivered in separate WLAN pt-to-pt communication links, and a maximum of eight MAC identifiers (MAC addresses) are used at the eNB 120 to identify the traffic from the UE's DRBs.

Both of the two approaches also contemplate use of additional packet header information in each packet so as to identify the DRB that is the source of the packet. The additional information identifying the DRB may be used by the eNB 120 to satisfy respective DRB parameters, such as QoS. In other words, a mechanism to identify the DRBs on the WLAN pt-to-pt communication link 190 allows the eNB 120 and the UE 110 to map traffic of the WLAN 180 to the corresponding per UE or per DRB PDCP/RLC contexts. For example, in some embodiments, a DRB identifier in a WLTP packet header (FIG. 6) may be used to identify DRBs on the WLAN pt-to-pt communication link 190. In other embodiments, an evolved packet system (EPS) bearer identifier, logical channel identifier (LCID), or any other identifier may be used.

In both approaches, the eNB 120 may send at least one RRC message (or similar message) to provide the UE 110 information about the v-MAC identifiers (MAC addresses) of the eNB 120. But skilled persons will also recognize that, in some other embodiments, other identifiers may be used, such as, for example, a randomly generated identifier transferred from the eNB to the AP, international mobile subscriber identity (IMSI), or other network entities. Furthermore, with respect to the data link layer (layer 2) in the seven-layer Open Systems Interconnection (OSI) model of computer networking, identifying a layer 2 tunnel over a WLAN link includes using UE and eNB/AP MAC identifiers, or reusing identifiers under discussion in TR 23.852, such as, for example, virtual MAC and virtual local area network identifiers.

In some embodiments, WLTP operation may be configured using enhanced RRC. This may be initiated by the eNB 120 or the UE 110. In both cases, the messages exchanged between the eNB 120 and the UE 110 allow for establishment of a WLTP tunnel, i.e., the messages include UE identifiers and bearer identifiers. An example of such message exchange is described as follows.

To configure WLTP, the eNB 120 sends an RRC message to the UE 110 via the cellular link 150, and the message provides the eNB 120's MAC address (or multiple MAC addresses) for user-plane WLTP. Multiple MAC addresses may be provided if the WLAN pt-to-pt communication link 190 is per DRB. For control-plane WLTP, the message may also include the eNB 120's MAC address or user datagram protocol (UDP) server port and IP address. Note that control-plane link identification information is optional when the control-plane WLTP uses the same WLAN pt-to-pt communication link 190 as that of the user-plane WLTP.

In response to the message, the UE 110 sends the following information in an RRC message: the UE 110's MAC address, which may be used to terminate the WLTP for both user-plane and control-plane at the UE 110 side of the link.

Link Protocol Definitions

Figure 4:
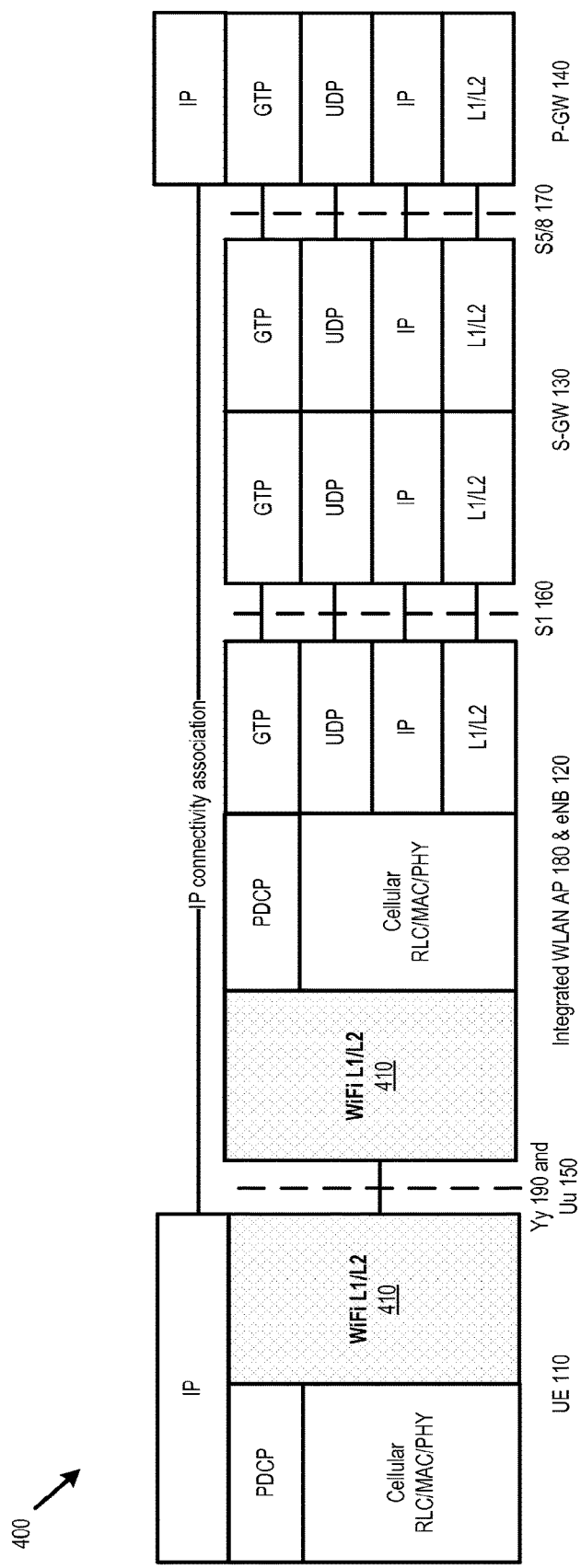
FIG. 4 is a block diagram of an IP-based user-plane tunneling protocol stack, according to another embodiment excluding the WLTP.
Figure 5:
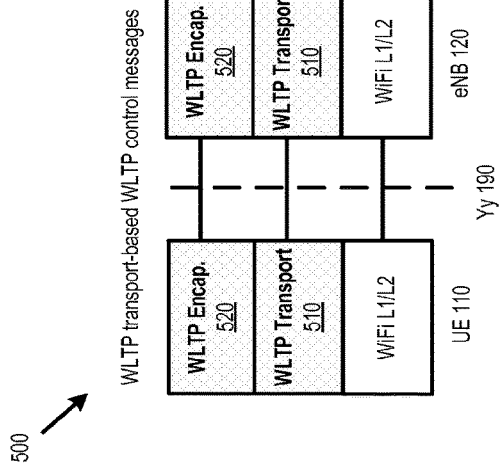
FIG. 5 is a block diagram of a WLTP transport-based control message protocol stack.
Figure 6:
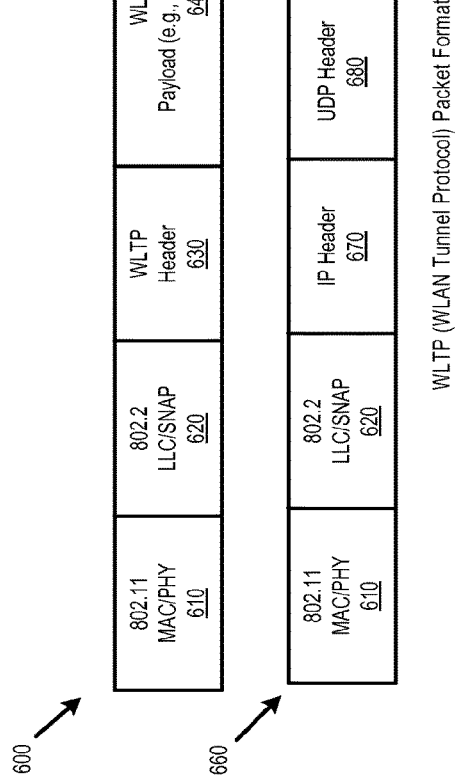
FIG. 6 is a pair of block diagrams of WLAN packet formats, according to two embodiments.

The following paragraphs of this subsection describe embodiments for user-plane tunneling protocol stacks, which include three variants that are each based on the protocol stack depth at which traffic is split from LTE traffic and instead routed over the WLAN 180. Accordingly, FIGS. 2, 3, and 4 show respective first, second, and third embodiments for user-plane tunneling. Also, FIGS. 5 and 6 show, respectively, a control-plane tunneling embodiment and a pair of WLAN packet format embodiments.

As an aside, it is noted that some of the drawings figures show various protocol layers that are not directly pertinent to the immediate discussion, but are otherwise included for completeness. For example, these other protocol layers include general packet radio service (GPRS) tunneling protocol (GTP), UDP, and several physical layer 1 and data link layer 2 (L1/L2) protocols Embodiments of FIGS. 2-4 can be understood by a brief comparison of their similarities and differences. For example, FIGS. 2 and 3 are similar because they both include use of a WLTP in the protocol stack, whereas the embodiment of FIG. 4 lacks a WLTP.

Generally speaking with respect to FIGS. 2 and 3, the WLTP includes a WLTP transport layer that may be defined in several different ways. For example, it could be defined as an Ethernet frame, or it could be defined as a UDP/IP frame—either type of these conventional transport layers could serve as the WLTP transport layer so long as a WLTP payload is defined. For example, in the case of UDP/IP, a dedicated port number may serve to identify the UDP/IP packet as including a WLTP payload.

In addition to the WLTP transport layer, there is also a WLTP encapsulation layer that provides the IP packet setup preparatory to transmission. Example WLTP encapsulation layer formats are defined in subsequent paragraphs in connection with a discussion of control messages defined by header values in the WLTP encapsulation layer that identify the payload information for supporting previously noted functions, including QoS measurement and bearer splitting. Suffice it to say for now, however, that encapsulation may be considered to be a packet header that defines information (QoS, sequence number, and other information used by the WLTP) to support the WLTP functions. As noted, a benefit of using WLTP encapsulation is to allow the receiver to measure QoS, such as packet loss rate and delay variation.

FIG. 2 is a block diagram of a protocol stack 200 showing a WLTP transport layer 210 and a WLTP encapsulation layer 220 that are collectively referred to as WLTP tunneling layers 230 (shown shaded in FIG. 2) used for traffic splitting. FIG. 2 shows that the WLTP tunneling layers 230 are directly below an IP layer 240 such that an IP packet is nested within a WLTP packet transmitted via the WLAN pt-to-pt communication link 190. Specifically, IP traffic is sent over the WLTP tunneling layers 230 as WLTP payloads having the form of an IP version 4 (IPv4) or an IP version 6 (IPv6) packet. Similarly, in parallel with the WLTP tunneling layers 230, a PDCP layer 250 of the radio traffic stack in the universal mobile telecommunications system (UMTS) encapsulates IP packets carried on the Uu LTE cellular link 150.

As discussed previously, bearers may be separately routed, in which case bearers are individually routed among one of the available radio access technologies (i.e., LTE or WLAN). In other embodiments, a single bearer may be split between LTE and WLAN. In the stack 200, if the eNB 120 is capable of inspecting an IP packet header field of a downlink data packet, then the UE 110's DRB may be split with the granularity of an IP flow. An IP flow consists of the IP packets sharing a common set of five different values (5-tuples) that comprises a transmission control protocol/internet protocol (TCP/IP) connection. The set includes a source IP address, a source port number, a destination IP address, a destination port number, and the protocol in use.

The arrangement of the WLTP tunneling layers 230 is advantageous because it allows for independent operation of the WLAN tunnel without explicitly accessing the 3GPP protocol stack (i.e., the PDCP layer 250 information) embedded within the 3GPP modem. A tradeoff, however, is that 3GPP security and ciphering functions cannot be used for the WLTP tunneling layers 230, and certain functionality offered by the 3GPP protocol stack may be duplicated for these layers.

FIG. 3 is a block diagram of a protocol stack 300 showing a WLTP transport layer 310 and a WLTP encapsulation layer 320, collectively WLTP tunneling layers 330 used for traffic splitting below an IP layer 340 and directly below a PDCP or RLC (PDCP/RLC) layer 350 of the cellular protocol stack. The asterisk on the RLC* of FIG. 3 means that the WLTP tunneling layers 330 may be below the RLC* in the PDCP/RLC layer 350 or above the RLC* in a cellular RLC*/MAC/physical (PHY) layer 360. In other words, WLTP may be run below either the PDCP or RLC layer.

Because traffic splitting happens below PDCP or RLC, the WLTP payload type will be a PDCP/RLC packet. Also, because an IP packet header is not visible to a splitting function in the stack 300, the UE 110's DRB is not available to be split with the granularity of an IP flow, but is instead available to be split with the granularity of the IP/PDCP packet (for the purpose of load balancing and bandwidth aggregation). Moreover, split packets of the same IP flow may be transmitted through both the WLAN pt-to-pt communication link 190 and the cellular link 150, such that the transmitted packets arrive out of order at the receiver. That is, either individual bearers will be transferred via a single radio access technology (LTE or WLAN), or a bearer may be split between LTE and WLAN. As a result, reordering of packets may be performed at the receiver, and may be supported as an aspect of the PDCP or in a higher layer function (e.g., the connection manager).

It is also noted that other integration protocols may be used to offload traffic at the MAC layer, i.e., below the RLC layer 360. In such cases, the 3GPP MAC layer operates at the "logical channel identifier" layer, and the eNB 120 and the UE 110 store for each UE (per UE) a mapping between DRB identifiers and the logical channel identifier so that traffic may be routed to and from the RLC layer 360. For offloading of traffic at the MAC layer, a WLTP packet header may directly include the logical channel identifier. For consistency, however, some embodiments may continue to use the aforementioned DRB identifier described in the previous subsection, and therefore rely on the 3GPP protocol stack to map DRB flows to corresponding logical channel resources.

FIG. 4 is a block diagram of a protocol stack 400 showing another embodiment that lacks a WLTP. Therefore, the UE 110 or the eNB 120 may send a user's IP packets directly in a layer-2 frame 410, without WLTP encapsulation. There is no additional encapsulation, and cellular IP packets are sent directly over the WLAN 180 via the WLAN pt-to-pt communication link 190. In contrast, WLTP encapsulation may be used in the stack 300 because a conventional layer-2 frame, absent encapsulation, cannot directly carry PDCP packets. Also, WLTP facilitates support for both per UE and per DRB approaches, whereas the stack 400 would not typically facilitate support for the per UE approach. Nevertheless, in some other embodiments, a new (or existing) EtherType may be used (or reused) to carry PDCP PDUs over the WLAN 180.

With respect to supporting control-plane messages for a UE and an eNB sharing a WLAN pt-to-pt communication link, two approaches are as follows: an enhanced RRC that carries the control messages over an LTE link, or WLTP control provided over the WLAN pt-to-pt communication link 190. The disclosure describes further details of the second, WLTP control approach, including a description of a WLTP control-plane protocol, as shown in FIG. 5.

FIG. 5 shows exchange of WLTP control-plane messages according to a WLTP transport-based embodiment. For example, FIG. 5 is a block diagram of a protocol stack 500 showing a WLTP transport layer 510, which may include UDP-based or Ethernet-based transport mechanisms, and a WLTP encapsulation layer 520.

A WLTP control message includes a payload type for identifying the type of WLTP control message. For example, the UE 110 may send a WLTP control message to the eNB 120 to determine if the WLAN pt-to-pt communication link 190 is still connected before the UE 110 switches from sending its traffic over cellular to sending it over the WLAN 180, and in response the eNB 120 may reply back with a control message indicating the status of the WLAN pt-to-pt communication link 190. In another example, the UE 110 may request that the eNB 120 send dummy probes that the UE 110 may use for evaluating the QoS of the WLAN pt-to-pt communication link 190, and the eNB 120 will then send to the UE 110 the dummy probes in the form of the WLTP control messages. Additional details of various control messages will be understood by skilled persons.

FIG. 6 shows two examples of WLAN packet formats.

A first WLAN packet 600 includes an IEEE 802.11 MAC/PHY packet header 610 and an IEEE 802.2 standard logical link control (LLC)/subnet access protocol (SNAP) packet header 620, which comprise a WLAN packet header. A WLAN payload includes a WLTP packet having a WLTP packet header 630 and a WLTP payload 640. In this embodiment, WLTP transport is based on a new type of Ethernet frame, identified by a predefined value of the EtherType field in the 802.2 LLC/SNAP packet header 620. Accordingly, the WLTP payload 640 may be an IP packet, a PDCP packet, a 3GPP LTE RRC packet, or any control messages that may be exchanged between the UE 110 and the eNB 120 via the WLAN pt-to-pt communication link 190.

A second WLAN packet 660 includes a similar WLAN packet header as that of the WLAN packet 600, but a WLAN payload includes an IP packet header 670, a UDP packet header 680, and the WLTP packet having the WLTP packet header 630 and the WLTP payload 640. In this embodiment, WLTP transport is based on a UDP connection, identified by a predefined value of a UDP port number identified in the UDP packet header 680. However, in both of the foregoing embodiments, the WLTP packet format is the same, irrespective of whether the WLTP transport is UDP or a new type of Ethernet frame.

The WLTP packet header 630 may consist of the following fields: T, an unsigned integer; SN, a sequence number of the tunnel packet; D, for delay measurements; and DRB identifier (ID), an unsigned integer. These are described in the following four paragraphs.

"T" is to indicate the WLTP payload type, e.g., IPv4, IPv6, PDCP PDU, MAC PDU, or WLTP control message.

"SN" is to measure packet loss, perform splitting functions, and reorder packets when switching traffic back and forth between 3GPP and WLAN. This field may be excluded when using the stack 400 (FIG. 4), because a PDCP packet header also has SN.

"D" is for receiving delay or jitter measurements of the transmission time interval, in the unit of milliseconds (ms). It essentially provides a means by which to measure when a packet is being sent from the transmitter (either the eNB 120 or the UE 110 client), and the interval between the aforementioned packet and a previously sent packet.

"DRB ID" is to identify the DRB of the packet. It may be ignored if the WLAN pt-to-pt communication link 190 itself is actually multiple links (per DRB), but it is otherwise useful for situations when the link 190 is on a per UE basis. In that approach, all of the UE's different bearers are sent over the same link 190, so the DRB ID identifies which bearer each packet belongs to.

Figure 7:
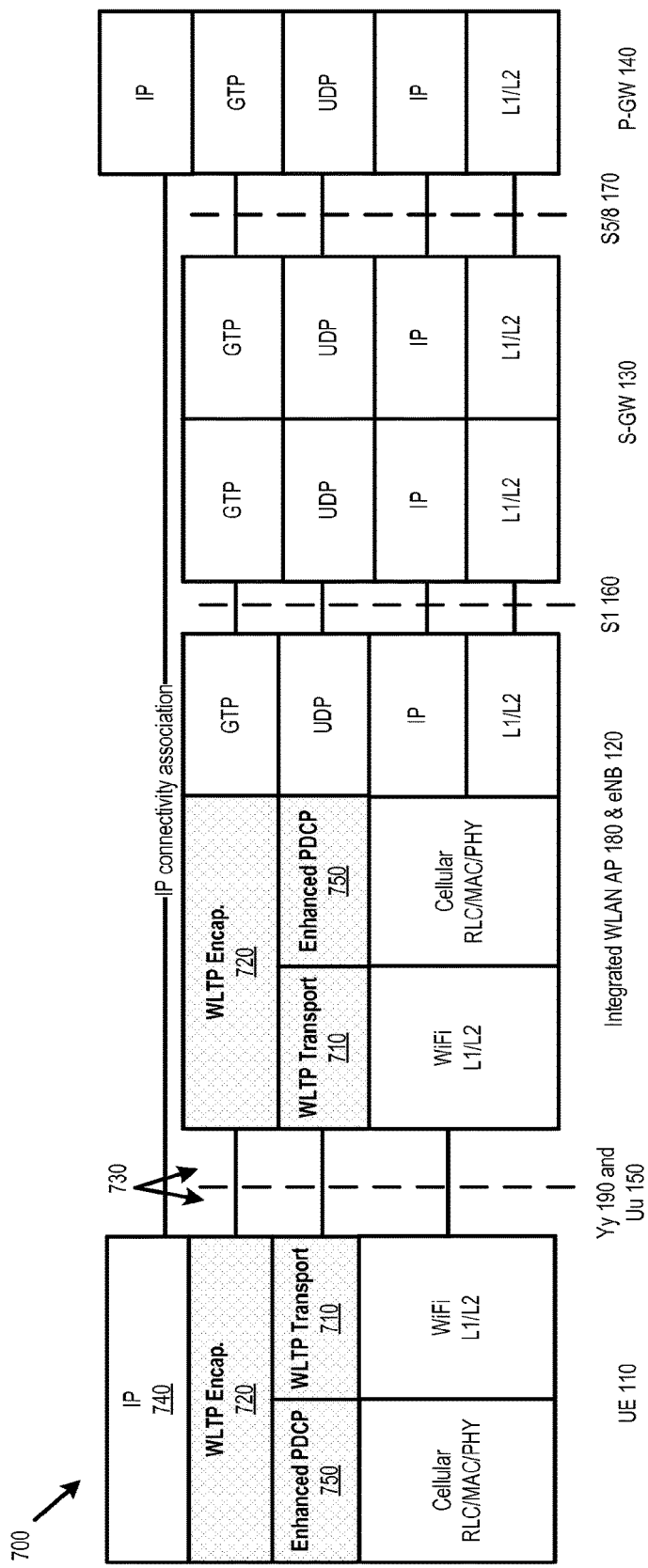
FIG. 7 is a block diagram of an enhanced IP-based user-plane tunneling protocol stack.

FIG. 7 shows enhancements to the stack 200 of FIG. 2. Because traffic is split directly below the IP layer 240, information present in the PDCP layer 250 is typically sent over the cellular link 150 and therefore not provided in the WLAN link pt-to-pt communication link 190. For example, the packets sent over the WLAN pt-to-pt communication link 190 would ordinarily lack PDCP cellular information such as the common sequence number. Therefore, it would be challenging in the stack 200 to perform joint measurements of the WLAN pt-to-pt communication link 190 and the cellular link 150, or, for that matter, to perform reordering or splitting (again, because the WLAN pt-to-pt communication link 190 of the stack 200 does not ordinarily carry common control information).

To enhance the stack 200 to provide common control information and to support bearer splitting and reordering, FIG. 7 shows the following enhancement: a WLTP encapsulation layer on top of both the WLAN and the cellular stacks. Specifically, FIG. 7 is a block diagram of a protocol stack 700 showing a WLTP transport layer 710 and a WLTP encapsulation layer 720 that are collectively referred to as WLTP tunneling layers 730 used for traffic splitting. As in the case of the stack 200 (FIG. 2), FIG. 7 shows that the WLTP tunneling layers 730 are directly below an IP layer 740 such that an IP packet is nested within a WLTP packet transmitted via the WLAN pt-to-pt communication link 190. But unlike in the stack 200, an enhanced PDCP layer 750 is below the WLTP encapsulation layer 720. Therefore, in the stack 700, the WLTP encapsulation layer 720 runs on both the WLAN pt-to-pt communication link 190 and the cellular link 150 for the purpose of bearer splitting and reordering.

The stack 700 includes the WLTP encapsulation layer 720 on top of both the WLAN and cellular stacks. However, as shown in the legacy packet format 800 of FIG. 8, current LTE devices are designed to support a conventional PDCP packet header 810 that encapsulates an IP packet 820. Therefore, these devices would not necessarily recognize the PDCP layer 750 carrying the IP layer 740 nested within the WLTP encapsulation layer 720.

Figure 8:
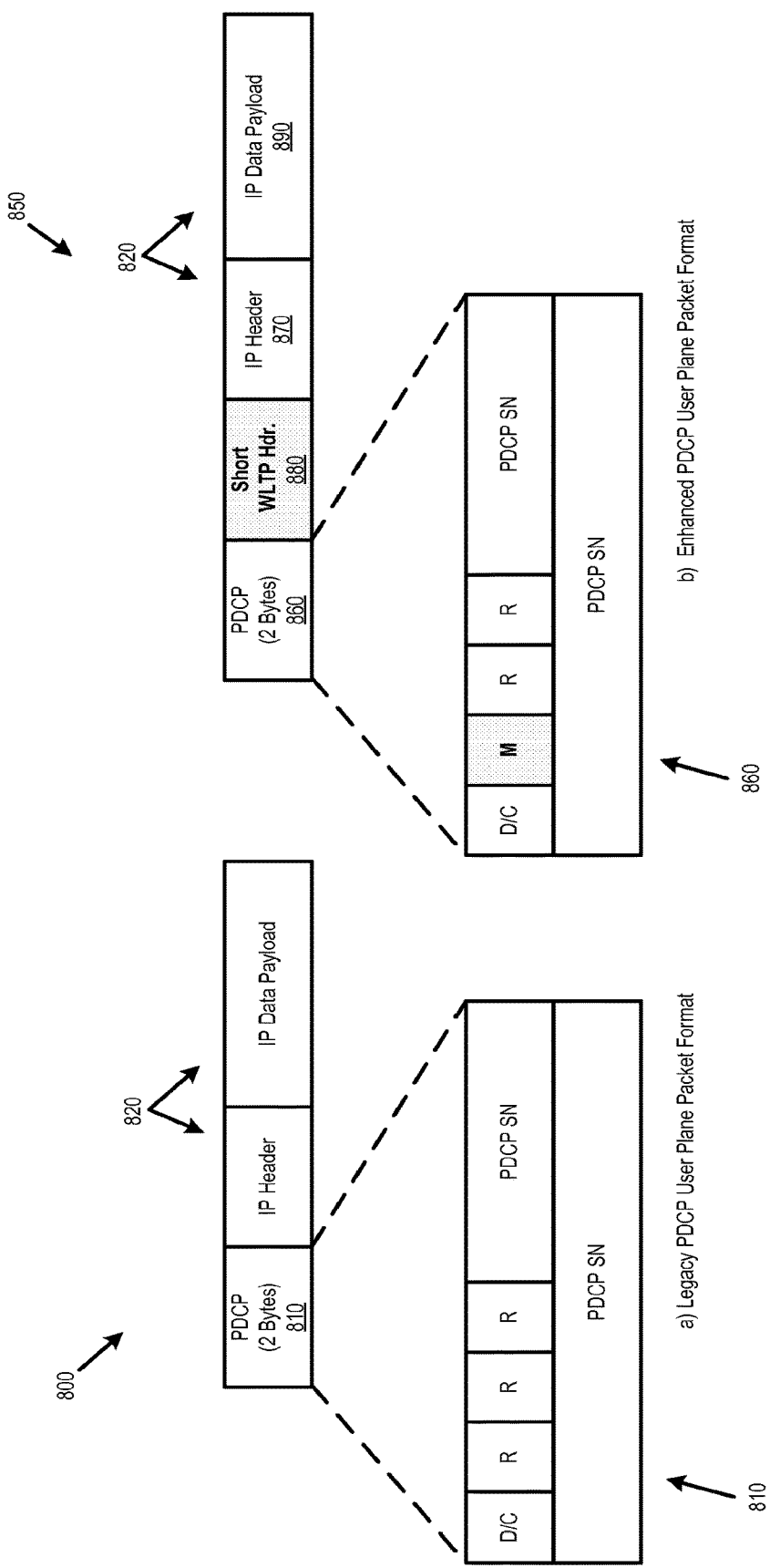
FIG. 8 is a block diagram of an enhanced PDCP data protocol data unit (PDU) format.

Accordingly, FIG. 8 also shows an enhanced PDCP packet format 850 that allows the PDCP layer 750 to carry the WLTP tunneling layers 730 such that LTE devices may be readily configured to receive the IP layer 740 nested within the WLTP encapsulation layer 720. The PDCP packet format 850 includes, following a PDCP packet header 860, and ahead of (i.e., in front of) an IP packet header 870, a short WLTP packet header 880. FIG. 8 also shows that a first one of three reserved "R" bits in the conventional PDCP packet header 810 is used as an "M" bit in the PDCP packet header 860 of the PDCP packet format 850. The "M" bit is used to indicate whether the PDCP packet header 860 encapsulates a WLTP packet, i.e., an enhanced PDCP payload, which includes the short WLTP packet header 880 and WLTP payload in the form of the IP packet 820 (IP packet header 870 and IP data payload 890), identified by the short WLTP packet header 880 field. The PDCP packet header 860 also includes a D/C bit that indicates whether the PDCP payload is for data or for control, and a first four bits and additional eight bits of a PDCP SN.

The fields of the short WLTP packet header 880 may be optionally reduced when a packet is sent over the cellular link 150. For example, when sent over the cellular link 150, the short WLTP packet header 880 may optionally contain "SN" and "T" information, but may exclude "D" or "DRB ID" information.

Note that PDCP only specifies the length of the short WLTP packet header 880 field in order to accurately locate IP packets in the PDCP payload so that it can perform header compression. The format of the short WLTP packet header 880 will be determined by WLTP.

EXAMPLE EMBODIMENTS

Embodiments described herein may be implemented into a system using any suitably configured hardware and/or software. FIG. 9 illustrates, for one embodiment, an example system comprising radio frequency (RF) circuitry, baseband circuitry, application circuitry, memory/storage, a display, a camera, a sensor, and an input/output (I/O) interface, coupled with each other at least as shown.

The application circuitry may include circuitry such as, but not limited to, one or more single-core or multi-core processors. The processor(s) may include any combination of general-purpose processors and dedicated processors (e.g., graphics processors, application processors, etc.). The processors may be coupled with memory/storage and configured to execute instructions stored in the memory/storage to enable various applications and/or operating systems running on the system.

The baseband circuitry may include circuitry such as, but not limited to, one or more single-core or multi-core processors. The processor(s) may include a baseband processor. The baseband circuitry may handle various radio control functions enabling communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a WLAN, or a wireless personal area network (WPAN). Embodiments in which the baseband circuitry is configured to support radio communications of more than one wireless protocol may be referred to as multi-mode baseband circuitry.

In various embodiments, baseband circuitry may include circuitry to operate with signals that are not strictly considered as being in a baseband frequency. For example, in some embodiments, baseband circuitry may include circuitry to operate with signals having an intermediate frequency, which is between a baseband frequency and a radio frequency.

RF circuitry may enable communication with wireless networks using modulated electromagnetic radiation through a non-solid medium. In various embodiments, the RF circuitry may include switches, filters, amplifiers, etc. to facilitate the communication with the wireless network.

In various embodiments, RF circuitry may include circuitry to operate with signals that are not strictly considered as being in a radio frequency. For example, in some embodiments, RF circuitry may include circuitry to operate with signals having an intermediate frequency, which is between a baseband frequency and a radio frequency.

In some embodiments, some or all of the constituent components of the baseband circuitry, the application circuitry, and/or the memory/storage may be implemented together on a system on a chip (SOC).

Memory/storage may be used to load and store data and/or instructions, for example, for the operating system. Memory/storage for one embodiment may include any combination of suitable volatile memory (e.g., dynamic random access memory (DRAM)) and/or non-volatile memory (e.g., flash memory).

In various embodiments, the I/O interface may include one or more user interfaces designed to enable user interaction with the system and/or peripheral component interfaces designed to enable peripheral component interaction with the system. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensors may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display may include a display such as a liquid crystal display or a touch screen display, etc.

In various embodiments, the system may be a mobile computing device such as, but not limited to, a laptop computing device, a tablet computing device, a netbook, an Ultrabook™, or a smartphone. In various embodiments, the system may have more or fewer components, and/or different architectures.

The following are additional example embodiments.

Example 1

A user equipment (UE) for communicating cellular data and control traffic, the UE comprising circuitry configured to: communicate cellular control traffic with an evolved universal terrestrial radio access network node B (eNB) through an air interface of a long term evolution (LTE) wireless network; establish in a wireless local area network (WLAN) a WLAN point-to-point communication link with the eNB for communication of cellular data traffic with the eNB through the WLAN point-to-point communication link; and communicate the cellular data traffic to the eNB through the WLAN point-to-point communication link.

Example 2

The UE of example 1, in which the WLAN point-to-point communication link comprises a set of WLAN point-to-point communication links, each member of the set of WLAN point-to-point communication links being identified by a data radio bearer (DRB) identifier received in a control message from the eNB.

Example 3

The UE of any of examples 1-2, in which the circuitry is further configured to communicate the cellular data traffic according to a layer one and layer two packet format for encapsulating internet protocol (IP) packets of an IP layer present in a network protocol stack of the WLAN.

Example 4

The UE of any of examples 1-2, in which the circuitry is further configured to communicate the cellular data traffic according to a WLAN tunneling protocol (WLTP) packet format for encapsulating internet protocol (IP) packets of an IP layer present in a network protocol stack of the WLAN.

Example 5

The UE of any of examples 1-2, in which the circuitry is further configured to communicate the cellular data traffic according to a WLAN tunneling protocol (WLTP) packet format encapsulating packet data convergence protocol (PDCP) packets of a PDCP layer present in a network protocol stack of the WLAN.

Example 6

The UE of any of examples 1-2, in which the circuitry is further configured to communicate the cellular data traffic according to a WLAN tunneling protocol (WLTP) packet format encapsulating radio link control (RLC) packets of an RLC layer present in a network protocol stack of the WLAN.

Example 7

The UE of any of examples 1-2 and 4-6, in which the circuitry is further configured to communicate the cellular data traffic in WLAN tunneling protocol (WLTP) tunneling layers defined below an internet protocol (IP) layer or below a packet data convergence protocol (PDCP) layer, the WLTP tunneling layers including a WLTP transport layer encapsulated by a WLTP encapsulation layer.

Example 8

A user equipment (UE) for wireless communication in a cellular network, the UE comprising: a radio frequency receiver to receive, through a wireless local area network (WLAN) connection with an evolved universal terrestrial radio access network node B (eNB), user- and control plane cellular packets; and a baseband controller to identify a WLAN tunneling protocol (WLTP) packet format in the user- and control-plane cellular packets received over the WLAN connection, in which the WLTP packet format includes a WLTP packet header and a WLTP payload.

Example 9

The UE of example 8, in which the WLTP packet format is included in a user datagram protocol (UDP)/internet protocol (IP) frame having a predetermined UDP port value indicating that the UDP/IP frame includes the WLTP payload.

Example 10

The UE of example 8, in which the WLTP packet format is included in an Ethernet frame identified by a predefined value of an EtherType field included in an Institute of Electrical and Electronics Engineers (IEEE) 802.2 standard frame packet header.

Example 11

The UE of any of examples 8-10, in which the WLTP payload may be in the form of an internet protocol (IP) packet, a packet data convergence protocol (PDCP) packet, a radio resource control (RRC) packet, or a control message exchanged between the UE and eNB via the WLAN connection.

Example 12

The UE of any of examples 8-11, in which the WLTP packet header includes a sequence number to establish a sequential order of cellular packets.

Example 13

The UE of any of examples 8-12, in which the WLTP packet header identifies the WLTP payload as including information representing a quality of service (QoS) of the WLAN connection.

Example 14

The UE of any of examples 8-13, in which the WLTP packet header identifies the WLTP payload as including an identifier of a data radio bearer for the WLTP payload.

Example 15

A method of establishing a wireless local area network (WLAN) point-to-point communication link defined by a Yy interface of a client and a base station, the method comprising: receiving from the base station a first control message through a Uu interface of the client and the base station; determining from the first control message an first identifier provided by the base station for identifying the WLAN point-to-point communication link; and sending to the base station a second control message providing a second identifier provided by the client for identifying the WLAN point-to-point communication link, the first identifier and the second identifier collectively identifying the WLAN point-to-point communication link defined by the Yy interface of the client and the base station.

Example 16

The method of example 15, further comprising receiving a media access control (MAC) address of the base station as the first identifier for establishing the WLAN point-to-point communication link on a per user equipment (UE) basis.

Example 17

The method of example 15, in which the WLAN point-to-point communication link comprises multiple WLAN point-to-point links corresponding to multiple data radio bearers (DRBs) of the client.

Example 18

The method of any of examples 15-17, further comprising communicating data radio bearer (DRB) information in packet header information communicated from the client to allow the base station to map cellular traffic received through the WLAN point-to-point communication link to corresponding DRBs for application of predetermined quality of service (QoS) parameters associated with the DRBs.

Example 19

The method of any of examples 15, 17, and 18, in which the first control message comprises a radio resource control (RRC) message indicating a number of data radio bearers (DRBs) supported at the eNB.

Example 20

The method of any of examples 15-19, further comprising sending a third control message through the Yy interface.

Example 21

A method performed by a user equipment (UE) for communicating cellular data and control traffic, the method comprising: communicating cellular control traffic with an evolved universal terrestrial radio access network node B (eNB) through an air interface of a long term evolution (LTE) wireless network; establishing in a wireless local area network (WLAN) a WLAN point-to-point communication link with the eNB for communication of cellular data traffic with the eNB through the WLAN point-to-point communication link; and communicating the cellular data traffic to the eNB through the WLAN point-to-point communication link.

Example 22

The method of example 21, in which the WLAN point-to-point communication link comprises a set of WLAN point-to-point communication links, each member of the set of WLAN point-to-point communication links being identified by a data radio bearer (DRB) identifier received in a control message from the eNB.

Example 23

The method of any of examples 21-22, further comprising communicating the cellular data traffic according to a layer one and layer two packet format for encapsulating internet protocol (IP) packets of an IP layer present in a network protocol stack of the WLAN.

Example 24

The method of any of examples 21-22, further comprising communicating the cellular data traffic according to a WLAN tunneling protocol (WLTP) packet format for encapsulating internet protocol (IP) packets of an IP layer present in a network protocol stack of the WLAN.

Example 25

The method of any of examples 21-22, further comprising communicating the cellular data traffic according to a WLAN tunneling protocol (WLTP) packet format encapsulating packet data convergence protocol (PDCP) packets of a PDCP layer present in a network protocol stack of the WLAN.

Example 26

The method of any of examples 21-22, further comprising communicating the cellular data traffic according to a WLAN tunneling protocol (WLTP) packet format encapsulating radio link control (RLC) packets of an RLC layer present in a network protocol stack of the WLAN.

Example 27

The method of any of examples 21-22 and 24-26, further comprising communicating the cellular data traffic in WLAN tunneling protocol (WLTP) tunneling layers defined below an internet protocol (IP) layer or below a packet data convergence protocol (PDCP) layer, the WLTP tunneling layers including a WLTP transport layer encapsulated by a WLTP encapsulation layer.

Example 28

A method performed by a user equipment (UE) for wireless communication in a cellular network, the method comprising: receiving, through a wireless local area network (WLAN) connection with an evolved universal terrestrial radio access network node B (eNB), user- and control plane cellular packets; and identifying a WLAN tunneling protocol (WLTP) packet format in the user- and control-plane cellular packets received over the WLAN connection, in which the WLTP packet format includes a WLTP packet header and a WLTP payload.

Example 29

The method of example 28, in which the WLTP packet format is included in a user datagram protocol (UDP)/internet protocol (IP) frame having a predetermined UDP port value indicating that the UDP/IP frame includes the WLTP payload.

Example 30

The method of example 28, in which the WLTP packet format is included in an Ethernet frame identified by a predefined value of an EtherType field included in an Institute of Electrical and Electronics Engineers (IEEE) 802.2 standard frame packet header.

Example 31

The method of any of examples 28-30, in which the WLTP payload may be in the form of an internet protocol (IP) packet, a packet data convergence protocol (PDCP) packet, a radio resource control (RRC) packet, or a control message exchanged between the UE and eNB via the WLAN connection.

Example 32

The method of any of examples 28-31, in which the WLTP packet header includes a sequence number to establish a sequential order of cellular packets.

Example 33

The method of any of examples 28-32, in which the WLTP packet header identifies the WLTP payload as including information representing a quality of service (QoS) of the WLAN connection.

Example 34

The method of any of examples 28-33, in which the WLTP packet header identifies the WLTP payload as including an identifier of a data radio bearer for the WLTP payload.

Example 35

Machine-readable storage including machine-readable instructions to, when executed, implement a method as set forth in any one of examples 15-34.

Example 36

A system comprising means for performing a method as set forth in any one of examples 15-34.

Example 37

A UE including logic to perform a method as set forth in any one of examples 15-20.

The foregoing description of one or more implementations is not intended to be exhaustive or to limit the scope of the invention to the precise form disclosed. Modifications and variations are possible in light of the above teachings or may be acquired from practice of various implementations of the invention.

It will be understood by skilled persons that many changes may be made to the details of the above-described embodiments without departing from the underlying principles of the invention. The scope of the present invention should, therefore, be determined only by the following claims.

The invention claimed is:

1. An apparatus for a user equipment (UE) configured to receive a wireless local area network (WLAN) packet formed according to a network protocol stack and including user data offloaded from a cellular base station, the apparatus comprising:
 a memory configured to store a data radio bearer identifier (DRBID) of a data radio bearer associated with an upper layer of the network protocol stack to which the user data should be delivered based on the DRBID; and
 baseband processing circuitry configured to:
  process a first data unit of the WLAN packet to identify the data radio bearer, the first data unit associated with a lower layer of the network protocol stack and including a header and a data field, the header having the DRBID, and the data field having a second data unit including the user data;
  generate the second data unit without the DRBID and the header from the first data unit; and
  deliver for the data radio bearer the second data unit including the user data.

2. The apparatus of claim 1, in which the lower layer corresponds to a WLAN physical layer.

3. The apparatus of claim 1, in which the lower layer corresponds to a WLAN data link layer.

4. The apparatus of claim 1, in which the upper layer corresponds to a packet data convergence protocol (PDCP) layer.

5. The apparatus of claim 1, in which the header includes one or more bits that are reserved bits.

6. The apparatus of claim 1, in which the data field is of variable size.

7. The apparatus of claim 1, in which the baseband processing circuitry is further configured to process a Radio Resource Control (RRC) message to configure user-data offloading.

8. The apparatus of claim 1, in which the WLAN packet includes an EtherType for forwarding the user data to the UE over a WLAN.

9. The apparatus of claim 1, in which the data radio bearer is a split bearer.

10. An apparatus for a user equipment (UE) for a wireless communication system, the apparatus comprising:
 a memory configured to store a first data unit that includes a data radio bearer identifier (DRBID) and user data; and
 a processor configured to:
  process, from a wireless local area network (WLAN) layer, the first data unit to identify a data radio bearer associated with a packet data convergence protocol (PDCP) layer to which the user data should be delivered based on the DRBID;
  generate a second data unit including the user data by removal of the DRBID and associated header information from the first data unit; and deliver the second data unit for the data radio bearer associated with the PDCP layer.

11. The apparatus of claim 10, in which the WLAN layer is a physical or data link layer.

12. The apparatus of claim 10, in which the processor is further configured to process a Radio Resource Control (RRC) message to configure user-data offloading.

13. The apparatus of claim 10, in which the data radio bearer is a split bearer.

14. The apparatus of claim 13, in which the processor is further configured to reorder packets of the split bearer.

15. A computer-readable storage medium having stored thereon instructions that, when executed by one or more processors of a cellular base station, cause the one or more processors to perform operations comprising:
  process a first packet from a packet data convergence protocol (PDCP) layer;
  generate a second packet that includes the first packet and a data radio bearer identifier (DRBID) identifying a data radio bearer to which the first packet is associated with; and
  provide the second packet to a lower layer for transmission to a user equipment (UE) over a wireless local area network (WLAN) connection between the UE and the cellular base station.

16. The computer-readable storage medium of claim 15 having stored thereon further instructions that, when executed by the one or more processors, further cause the one or more processors to perform operations comprising include an EtherType for the second packet indicating the second packet includes user data associated with the data radio bearer.

17. The computer-readable storage medium of claim 15 having stored thereon further instructions that, when executed by the one or more processors, further cause the one or more processors to perform operations comprising generate a Radio Resource Control (RRC) message to configure user-data offloading over the WLAN connection.

18. The computer-readable storage medium of claim 15 having stored thereon further instructions that, when executed by the one or more processors, further cause the one or more processors to perform operations comprising split the data radio bearer so as to send packets over the WLAN connection.

19. The computer-readable storage medium of claim 15, in which the lower layer is a WLAN physical layer.

20. The computer-readable storage medium of claim 15, in which the lower layer is a WLAN data link layer.

* * * * *